TELEPHONE HANDSET

Filed Jan. 12, 1949 2 SHEETS—SHEET 1

INVENTOR.
Randall B. Baker
BY Kenway Jenney Witter & Hildreth
Attys.

Aug. 19, 1952 R. B. BAKER 2,607,857

TELEPHONE HANDSET

Filed Jan. 12, 1949 2 SHEETS—SHEET 2

INVENTOR.
Randall B. Baker
BY Kenway Jenney Witter & Hildreth
Attys.

Patented Aug. 19, 1952 2,607,857

UNITED STATES PATENT OFFICE 2,607,857

TELEPHONE HANDSET

Randall B. Baker, New York, N. Y., assignor to Wheeler Insulated Wire Co. Inc., Bridgeport, Conn., a corporation of Delaware Application January 12, 1949, Serial No. 70,475

2 Claims. (Cl. 179—103)

The present invention relates to telephone handsets.

The principal object of the present invention is to provide a simple and inexpensive molded telephone handset in which the transducer units may be simply and accurately mounted and in which no expensive screw connections are required.

With this object in view, the principal feature of the invention comprises a telephone handset which is molded of plastic material in longitudinal halves, the construction being such that all openings communicate with the plane of division whereby a satisfactory draft from the mold can be obtained.

Other features of the invention consist of certain novel features of construction and combinations and arrangement of parts hereinafter described and particularly defined in the claims.

Figures 1, 2, 3, 4, 5, 6:
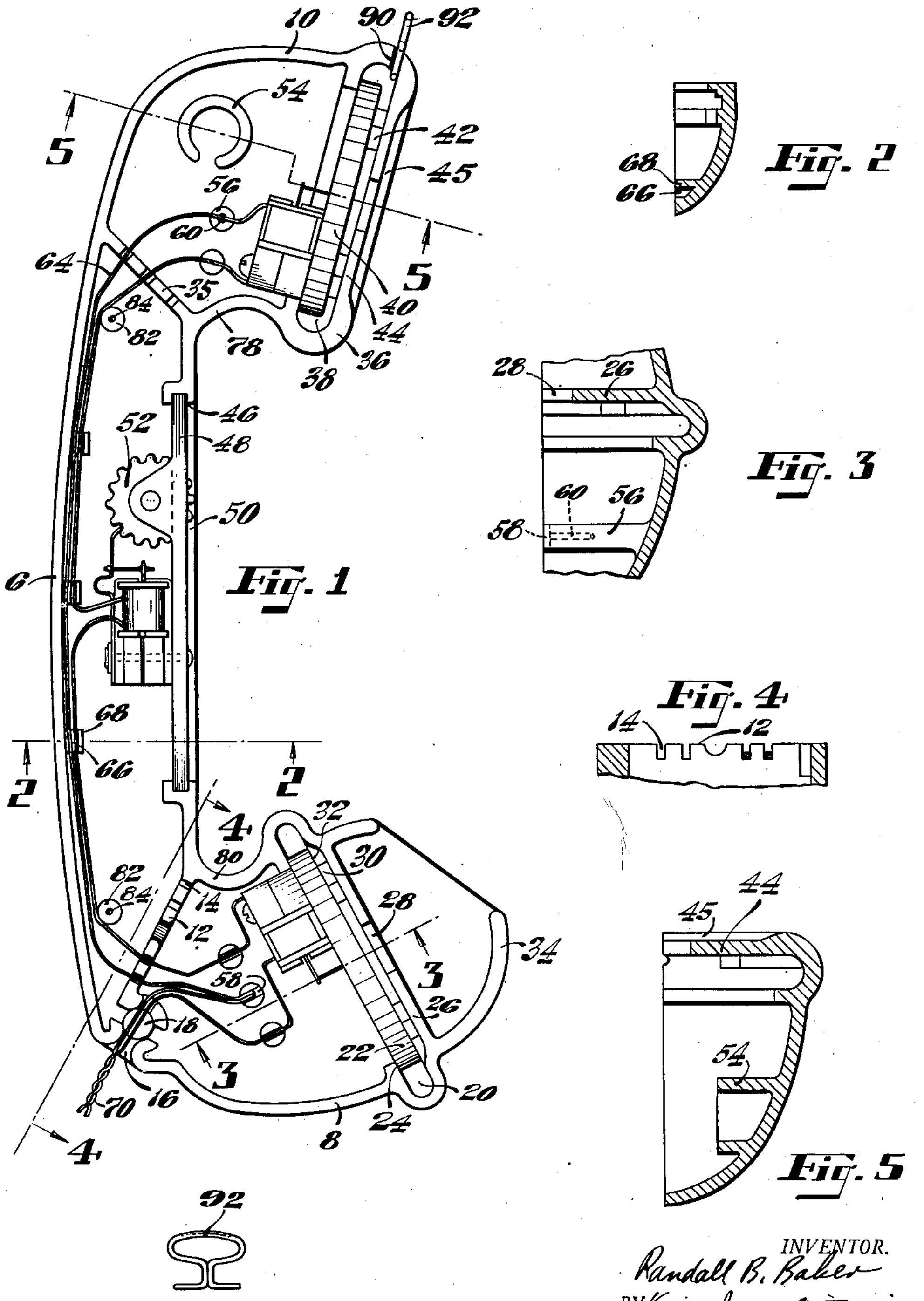
Figure 7:
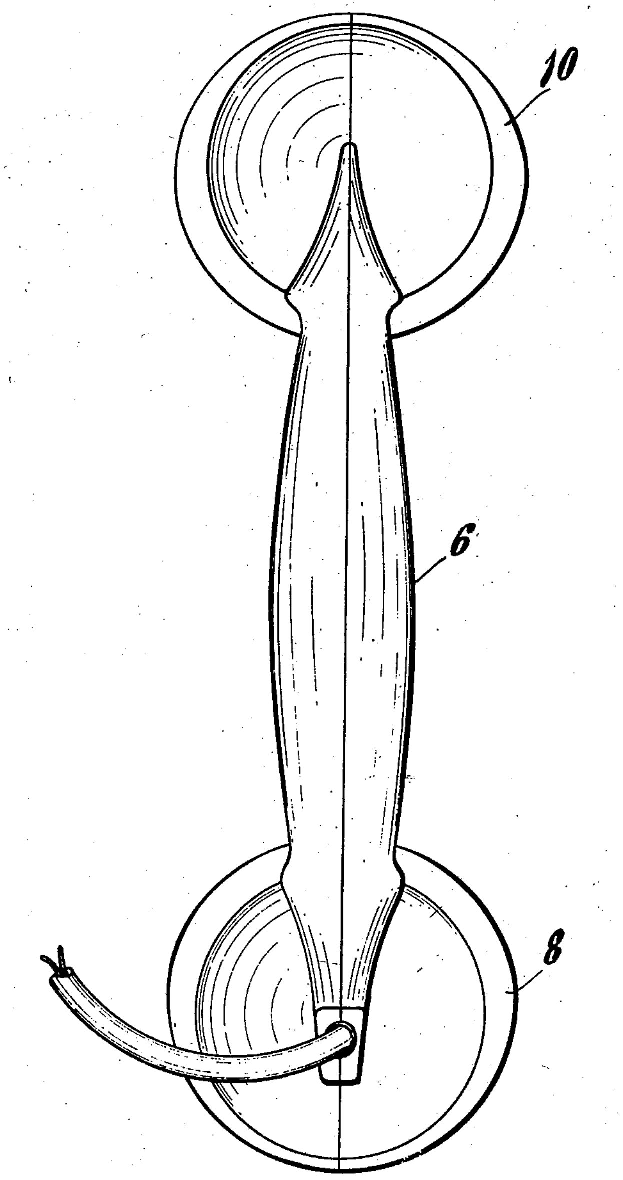

In the accompanying drawings Fig. 1 is an elevation of one-half of the preferred unit showing the transducers mounted therein; Fig. 2 is a section on line 2—2 of Fig. 1; Fig. 3 is a section on line 3—3 of Fig. 1; Fig. 4 is a section on line 4—4 of Fig. 1; Fig. 5 is a section on line 5—5 of Fig. 1; Fig. 6 is a detail view of the hook; and Fig. 7 is a view of the complete handset.

The preferred unit comprises two opposed halves of the type indicated in Fig. 1, the two halves being identical except for being opposed left and right. The molded half unit comprises a long intermediate handle section, indicated at 6, a transmitter section indicated at 8, and a receiver section indicated at 10. Although the unit is designed for any type of telephone device, it is particularly useful for and is here shown as embodied in a unit for accommodating sound-powered transducers of the type described in the Muldoon application Serial No. 670,585, filed May 17, 1946.

The handle section 6 merges with the transmitter section 8, being separated therefrom by a thin wall or septum 12 having suitable openings 14 for passage of cords, cables, etc. As indicated in Fig. 4 the holes 14 lead directly off the division plane, whereby they are readily drafted from the mold without the necessity of coring. An exit opening for a cord is indicated at 16. As shown at 18 there is provided a circular wall through which the cord passes and which can be filled either with a knot in the cord or with a plastic or wooden plug to keep the cord from slipping.

The end of the transmitter section is provided with a grooved annular portion 20 to receive the transducer unit 22. This unit is preferably of the type shown in the Muldoon application above referred to. It is securely held in position between a lip 24 of the grooved member 20 and the front plate 26 of the transmitter portion. The front plate 26 has an opening 28 for permitting the sound waves to be carried to the diaphragm of the unit. Positioning ribs 30 are molded in the inner face of the plate 26 to overlie the flanged portion 32 of the transducer unit. As shown in Figs. 1 and 3 these ribs extend toward the dividing plane and hence are arranged so they are readily drafted from the mold.

A cup-shaped member 34 may preferably be formed integral with the transmitter section of the handset to improve the acoustic properties of the unit.

The receiver portion 10 is similarly formed and is separated from the handle portion by a septum 35 which likewise has suitable openings for the passage of the cord or cable. The end of the receiver portion is formed as an ear piece 36 having an annular groove 38 similar to the portion 20 of the transmitter part. The receiving transducer 40 which may be identical with the unit 22 is held in the grooved portion 38 and likewise against ribs, here shown as ribs 42, formed on the inner surface of the face plate 44. These ribs overlie the flange of the transducer and serve to hold it in position. The face plate has a semi-circular sound-transmitting orifice 45 communicating direct with the division plane.

The handle portion is formed at its inner surface with a slot 46 to accommodate a plate 48. In some constructions this plate may comprise simply a metal nameplate. As here shown, however, the plate 48 serves as a mounting member for a calling unit indicated generally at 50 and including a thumb-actuated wheel 52 whereby a high level squawking noise may be sent over the line for calling purposes. This unit is not claimed as part of the present invention but is described and claimed in the copending application of Baker and Maloney, Serial No. 70,476, filed January 12, 1949.

A ring 54 is formed in the wall of the receiver unit and is extended inwardly therefrom as shown in Figs. 1 and 5 to receive a tubular condenser which for some units may be paralleled with the receiver. The condenser is not shown in the drawings.

For the wire connections the unit is provided with integrally molded posts 56, each of which has a slot 58 and a central hole 60 as shown in Fig. 3. The leads from the transducers are soldered to the cable and the soldered ends are inserted into the holes of the posts. The wires lie in the slots 58. The wires are also passed through the openings in the septums 12 and 34 as shown in Fig. 1.

In the preferred connections, the receiver, the transmitter, and the winding of the calling unit 50 are all connected in series. These series connections are shown in Fig. 1. The wires 64 which run through the handle from one end of the unit to the other are positioned in slots 66 formed in ears 68 molded integral with the handle as shown in Figs. 1 and 2.

For the external connections a cord 70 is provided. This cord is here shown merely as twisted pair passing through the opening 16 to communicate with the circular opening 18 in the inner part of the transmitter portion of the receiver. For inexpensive units such as toy telephones, the cable is held in place with a plug inserted into the opening 18. Of if desired, a knot may be tied in the cord and placed in the opening. For covered cable the opening 16 may be reamed to a size which will hold the cable securely.

The gates are preferably formed in one or both of the inner curved portions between the handle and the transmitter portion and between the handle and the receiver portion, in the places indicated at 78 and 80. Since these gates are in inaccessible and unnoticeable positions, they may be merely chipped off for inexpensive toy telephone units or they may be more fully finished for units of higher grade.

As heretofore noted the orifices 28 and 42 open directly from the division plane. This is also true of the wire-positioning openings 14 and slots 66. Furthermore, the posts 56, the ribs 30 and 42, the walls of the ring 54 and all other internal members have surfaces perpendicular to the division plane, whereby the pieces may be molded without the necessity for cores, metal inserts, or the like.

The half unit thus described is conveniently made by injection molding. The other half unit is identical except for being opposed left to right. After insertion of the transducers and the plate 48 and after connection of the cords in one-half of the set, the other half of the set is simply placed over it and is cemented thereto along the dividing plane. The locating of the two halves is made sufficiently accurate by the positioning of the transducers and the plate 48, especially since the transducers are accurately positioned by means of the ribs 30 and 42. Additional precision for location may, however, be provided by posts 82 which are integrally molded in the handle. These pins are shown in Fig. 1 as serving to position the wires. Each post 82 is provided with a central hole 84 into which a small metal pin may be inserted if desired, whereby upon assembly of the units the metal pins firmly lock the halves in position. After cementing of the halves, the entire unit may be buffed or polished to eliminate the appearance of the dividing plane.

It will be observed that the soldered wire connections are firmly held by the opposed posts 56 and 58 of the two halves.

If desired, a suspension ring may be inserted in a small opening 90 provided at one end of the receiver. The ring is shown in Fig. 6 at 92 and may be inserted into one half before assembly, being locked in place by the positioning of the other half-unit with respect thereto.

The present construction, it will be noted, provides for the utmost simplicity in the molding operation and also in the assembling operation. There are no screw caps and the cost of the unit is kept at a minimum. The handset is of attractive appearance. For cheap units, such as toys, the handset portions are preferably molded of polystyrene, whereas for higher grade units, they may be molded from acetate or other plastic. It is therefore possible to provide a toy unit at a very low cost, but the same molds may be used for higher-grade units, such as, for example, sets for farm communication, inter-office communication, etc.

Having thus described the invention, I claim:

1. A telephone handset comprising two transducer units and two molded longitudinal half-members, each having a transmitter portion, a receiver portion and a connecting handle portion, the transmitter portion and receiver portion of each half-member having a semi-circular annular groove adapted to receive a transducer unit by edgewise insertion, the two half-members being secured together and holding said transducer units securely, and the transducer units positioning the two half-members with respect to each other.

2. A telephone handset comprising two transducer units and two molded longitudinal half-members, each having a transmitter portion, a receiver portion and a connecting handle portion, the transmitter portion and receiver portion of each half-member having a semi-circular annular groove and integral molded positioning ribs, said groove and ribs being adapted to receive a transducer unit by edgewise insertion between a wall portion of said groove and surfaces of said ribs, the two half-members being positioned with respect to each other by the transducer units, and being secured together and holding said transducer units securely.

RANDALL B. BAKER.

REFERENCES CITED

The following references are of record in the file of this patent:

UNITED STATES PATENTS

| Number | Name | Date |
|---|---|---|
| 1,631,607 | Soldan | June 7, 1927 |
| 2,475,303 | Allen | July 5, 1949 |

FOREIGN PATENTS

| Number | Country | Date |
|---|---|---|
| 374,946 | Great Britain | June 20, 1932 |